(12) United States Patent
Brooks et al.

(10) Patent No.: US 12,090,987 B2
(45) Date of Patent: Sep. 17, 2024

(54) SYSTEM AND METHOD FOR CONTROLLING A GROUND SPEED OF AN AGRICULTURAL SPRAYER

(71) Applicant: CNH Industrial America LLC, New Holland, PA (US)

(72) Inventors: Nathan Paul Brooks, Manitowoc, WI (US); John Patrick Greifzu, Woodridge, IL (US)

( * ) Notice: Subject to any disclaimer, the term of this patent is extended or adjusted under 35 U.S.C. 154(b) by 751 days.

(21) Appl. No.: 17/242,402

(22) Filed: Apr. 28, 2021

(65) Prior Publication Data

US 2022/0264797 A1 Aug. 25, 2022

Related U.S. Application Data

(60) Provisional application No. 63/151,921, filed on Feb. 22, 2021.

(51) Int. Cl.
*A01D 41/127* (2006.01)
*A01B 59/00* (2006.01)
(Continued)

(52) U.S. Cl.
CPC ......... *B60W 10/103* (2013.01); *A01B 59/002* (2013.01); *A01C 23/007* (2013.01); *A01C 23/008* (2013.01); *A01C 23/047* (2013.01); *A01D 41/1274* (2013.01); *A01D 69/00* (2013.01); *A01M 7/0042* (2013.01); *A01M 7/0057* (2013.01); *A01M 7/0085* (2013.01); *A01M 7/0089* (2013.01); *B05B 1/20* (2013.01); *B05B 12/02* (2013.01); *B05B 12/081* (2013.01); *B05B 12/085* (2013.01); *B05B 12/14* (2013.01); *B05B 12/16* (2018.02); *B05B 15/55* (2018.02); *B05B 15/65* (2018.02); *B08B 3/02* (2013.01); *B08B 5/02* (2013.01); *B60W 10/06* (2013.01); *B60W 10/18* (2013.01); *B60W 10/182* (2013.01); *B60W 30/18118* (2013.01);
(Continued)

(58) Field of Classification Search
None
See application file for complete search history.

(56) References Cited

U.S. PATENT DOCUMENTS 5,417,193 A 5/1995 Fillman et al.
5,549,089 A 8/1996 Snell et al.
(Continued)

*Primary Examiner* — Gary Collins
(74) *Attorney, Agent, or Firm* — Rebecca Henkel; Peter K. Zacharias; Rickard K. DeMille

(57) ABSTRACT

A system for controlling a ground speed of an agricultural sprayer includes a speed setting device for commanding a selected ground speed of the sprayer when operating within a speed-range mode associated with a ground speed range. The speed setting device is movable across a plurality of positions, with each position being associated with a different ground speed within the ground speed range. A maximum range speed of the ground speed range is lower than a maximum ground speed of the sprayer. As such, the system includes a speed override input device for commanding that the ground speed of the sprayer be increased to the maximum ground speed. When an override input is received from the speed override input device, the computing system controls the operation of a sprayer drive system to increase the ground speed of the sprayer from the selected ground speed to the maximum ground speed.

20 Claims, 5 Drawing Sheets

(51) Int. Cl.

| | | |
|---|---|---|
| *A01C 23/00* | (2006.01) | |
| *A01C 23/04* | (2006.01) | |
| *A01D 69/00* | (2006.01) | |
| *A01M 7/00* | (2006.01) | |
| *B05B 1/20* | (2006.01) | |
| *B05B 12/02* | (2006.01) | |
| *B05B 12/08* | (2006.01) | |
| *B05B 12/14* | (2006.01) | |
| *B05B 12/16* | (2018.01) | |
| *B05B 15/55* | (2018.01) | |
| *B05B 15/65* | (2018.01) | |
| *B08B 3/02* | (2006.01) | |
| *B08B 5/02* | (2006.01) | |
| *B60W 10/06* | (2006.01) | |
| *B60W 10/103* | (2012.01) | |
| *B60W 10/18* | (2012.01) | |
| *B60W 30/18* | (2012.01) | |
| *B60W 40/076* | (2012.01) | |
| *B67D 7/02* | (2010.01) | |
| *B67D 7/36* | (2010.01) | |
| *B67D 7/38* | (2010.01) | |
| *B67D 7/78* | (2010.01) | |
| *B67D 99/00* | (2010.01) | |
| *E02F 3/46* | (2006.01) | |
| *E02F 9/22* | (2006.01) | |
| *F16L 3/22* | (2006.01) | |
| *G01M 3/32* | (2006.01) | |
| *G05D 1/00* | (2006.01) | |
| *G05D 1/223* | (2024.01) | |
| *G07C 5/00* | (2006.01) | |
| *G07C 5/08* | (2006.01) | |
| *B05B 14/00* | (2018.01) | |
| *G01F 23/70* | (2006.01) | |

(52) U.S. Cl.
CPC ............ *B60W 40/076* (2013.01); *B67D 7/02* (2013.01); *B67D 7/0294* (2013.01); *B67D 7/36* (2013.01); *B67D 7/362* (2013.01); *B67D 7/38* (2013.01); *B67D 7/78* (2013.01); *B67D 99/00* (2013.01); *E02F 3/46* (2013.01); *E02F 9/2271* (2013.01); *E02F 9/2275* (2013.01); *F16L 3/221* (2013.01); *G01M 3/3245* (2013.01); *G05D 1/0016* (2013.01); *G05D 1/223* (2024.01); *G07C 5/008* (2013.01); *G07C 5/08* (2013.01); *A01M 7/0082* (2013.01); *B05B 14/00* (2018.02); *B08B 2203/0205* (2013.01); *B60W 2520/10* (2013.01); *B60W 2552/15* (2020.02); *B60W 2720/10* (2013.01); *G01F 23/70* (2013.01)

(56) References Cited

U.S. PATENT DOCUMENTS

| | | | |
|---|---|---|---|
| 5,755,382 | A | 5/1998 | Skotinkov |
| 6,022,291 | A | 2/2000 | Weddle |
| 6,311,795 | B1 | 11/2001 | Skotnikov et al. |
| 6,633,804 | B2 | 10/2003 | Dix et al. |
| 6,718,244 | B2 | 4/2004 | Lin et al. |
| 7,458,917 | B2 | 12/2008 | Yoshikawa et al. |
| 7,563,199 | B2 | 7/2009 | Ringer |
| 7,613,560 | B2 | 11/2009 | Nishi et al. |
| 7,954,592 | B2 | 6/2011 | Miyazaki et al. |
| 8,251,868 | B2 | 8/2012 | Ichikawa et al. |
| 10,054,225 | B2 | 8/2018 | Bittner et al. |
| 10,112,586 | B2 | 10/2018 | Brooks et al. |
| 10,338,801 | B2 | 7/2019 | Brooks et al. |
| 10,590,630 | B2 | 3/2020 | Hasegawa |
| 10,627,824 | B2 | 4/2020 | Runde et al. |
| 2008/0047245 | A1* | 2/2008 | MacGregor ............ B60K 6/12 56/10.8 |
| 2011/0301825 | A1* | 12/2011 | Grajkowski ........... B60K 28/10 180/54.1 |
| 2014/0138166 | A1* | 5/2014 | Otto ...................... B62D 11/04 180/6.48 |
| 2014/0331630 | A1* | 11/2014 | Phillips ................. B60T 8/1755 56/10.2 H |
| 2015/0066309 | A1* | 3/2015 | Porter ................... B60W 10/02 701/48 |
| 2015/0337954 | A1* | 11/2015 | Storey .................. G05D 1/0891 701/70 |
| 2019/0075725 | A1 | 3/2019 | Volovsek et al. |
| 2020/0032480 | A1 | 1/2020 | Kukuk et al. |
| 2020/0331487 | A1* | 10/2020 | Darrah, Jr. ............ B60K 35/28 |
| 2020/0348714 | A1 | 11/2020 | Ofenloch et al. |
| 2021/0289694 | A1* | 9/2021 | Aldridge ................ A01D 34/44 |

* cited by examiner

SYSTEM AND METHOD FOR CONTROLLING A GROUND SPEED OF AN AGRICULTURAL SPRAYER

CROSS REFERENCE TO RELATED APPLICATION

The present application is based upon and claims the right of priority to U.S. Provisional Patent Application No. 63/151,921 filed on Feb. 22, 2021, the entirety of which is incorporated by reference herein for all purposes.

FIELD OF THE INVENTION

The present disclosure relates generally to agricultural sprayers and, more particularly, to systems and methods for controlling a ground speed of an agricultural sprayer.

BACKGROUND OF THE INVENTION

Agricultural applicators or sprayers have been used within the industry for applying an agricultural product to crops and/or a surface of a field. The agricultural product may be in the form of a solution or mixture, with a carrier (such as water) being mixed with one or more active ingredients, such as a pesticide(s) (e.g., an herbicide(s), insecticide(s), rodenticide(s), etc.) and/or a nutrient(s). Typically, an applicator or sprayer is pulled as an implement or is self-propelled, and includes a tank, a pump, and a sprayer boom. The sprayer boom can include a pair of boom arms, with each boom arm extending to either side of the sprayer when in an unfolded state. Each boom arm may include multiple boom sections, each with a number of spray nozzles (also sometimes referred to as spray tips).

Drive components of some agricultural sprayers may be controlled according to a plurality of available ground speed ranges. The ground speed ranges allow for quickly changing speeds for different conditions during a spraying operation (e.g., soil type, agricultural product being applied, field topography, and/or the like) and for faster transport (e.g., between adjacent fields). As such, the maximum speeds for the ground speed ranges are typically lower than a maximum ground speed of the agricultural sprayer so that sufficient coverage and reduced drift of the agricultural product are ensured during the spraying operation. If an operator wishes to move at the maximum ground speed of the agricultural sprayer, the operator is typically required to switch from the current speed range to a different speed range and then command the maximum ground speed or provide numerous inputs to change the maximum speed of the current ground speed range to the maximum ground speed of the agricultural sprayer. However, such methods are time consuming and require the operator to change and/or reset range settings when returning to a spraying operation.

Accordingly, an improved system and method for controlling a ground speed of an agricultural sprayer would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for controlling a ground speed of an agricultural sprayer. The system includes a speed setting device for commanding a selected ground speed of the agricultural sprayer when operating within a speed-range mode associated with a ground speed range. The speed setting device is movable across a plurality of positions, with each position of the speed setting device being associated with a different ground speed within the ground speed range. The ground speed range extends from a minimum range speed to a maximum range speed, where the maximum range speed is lower than a maximum ground speed of the agricultural sprayer. The system further includes a speed override input device for commanding that the ground speed of the agricultural sprayer be increased to the maximum ground speed. Moreover, the system includes a drive system configured to adjust the ground speed of the agricultural sprayer. Additionally, the system includes a computing system communicatively coupled to the speed setting device, the speed override input device, and the drive system. The computing system is configured to control an operation of the drive system to adjust the ground speed of the agricultural sprayer based on the selected ground speed associated with an actuated position of the speed setting device when in the speed-range mode. Also, when an override input is received from the speed override input device, the computing system is configured to control the operation of the drive system to increase the ground speed of the agricultural sprayer from the selected ground speed to the maximum ground speed.

In another aspect, the present subject matter is directed to a method for controlling a ground speed of an agricultural sprayer. The method includes receiving, with one or more computing devices, an input from a speed setting device indicative of a selected ground speed within a ground speed range associated with a speed-range mode. The speed setting device is movable across a plurality of positions, with each position of the speed setting device being associated with a different ground speed of the ground speed range. The ground speed range extends from a minimum range speed to a maximum range speed, with the maximum range speed being lower than a maximum ground speed of the agricultural sprayer. The method further includes controlling, with the one or more computing devices, a drive system of the agricultural sprayer to adjust the ground speed of the agricultural sprayer based on the selected ground speed associated with an actuated position of the speed setting device in response to receiving the input from the speed setting device. Moreover, the method includes receiving, with the one or more computing devices, an override input from a speed override input device commanding that the ground speed of the agricultural sprayer be increased to the maximum ground speed. Additionally, the method includes controlling, with the one or more computing devices, the drive system of the agricultural sprayer to increase the ground speed of the agricultural sprayer from the selected ground speed to the maximum ground speed in response to receiving the override input from the speed override input device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
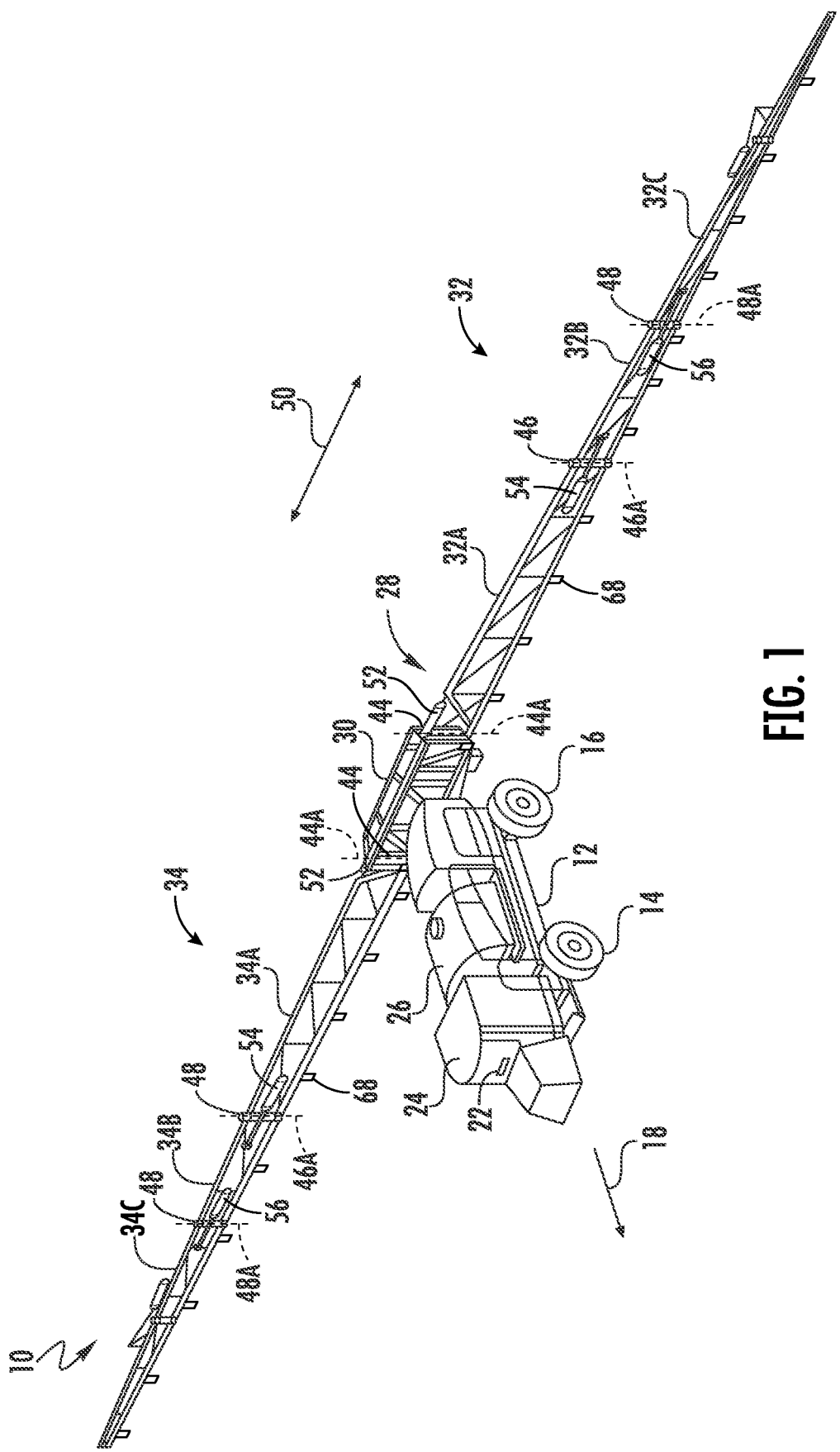
FIG. 1 illustrates a perspective view of one embodiment of an agricultural sprayer in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling a ground speed of an agricultural sprayer. Specifically, in several embodiments, a system for controlling a ground speed of an agricultural sprayer includes a speed setting device for commanding a selected ground speed when the agricultural sprayer is operated within a speed-range mode associated with a ground speed range. The speed setting device is actuatable by an operator across a range of positions, with each position being associated with a different selected ground speed between a minimum range speed and a maximum range speed of the associated ground speed range. When a controller of the disclosed system receives an input from the speed setting device, the controller controls an operation of a drive system of the agricultural sprayer to adjust the ground speed of the agricultural sprayer to the speed associated with the actuated position of the speed setting device. In instances in which the maximum range speed is lower than the maximum ground speed of the agricultural sprayer, the disclosed system provides a speed override input device to quickly command the maximum ground speed of the agricultural sprayer. When the controller of the disclosed system receives an input from the speed override input device, the controller controls the operation of the drive system to automatically increase the ground speed of the agricultural sprayer from the current ground speed within the associated ground speed range to the maximum ground speed. As such, an operator may quickly command a maximum ground speed of the sprayer without changing between ground speed ranges and without changing a maximum range speed of the selected ground speed range.

Figure 2:
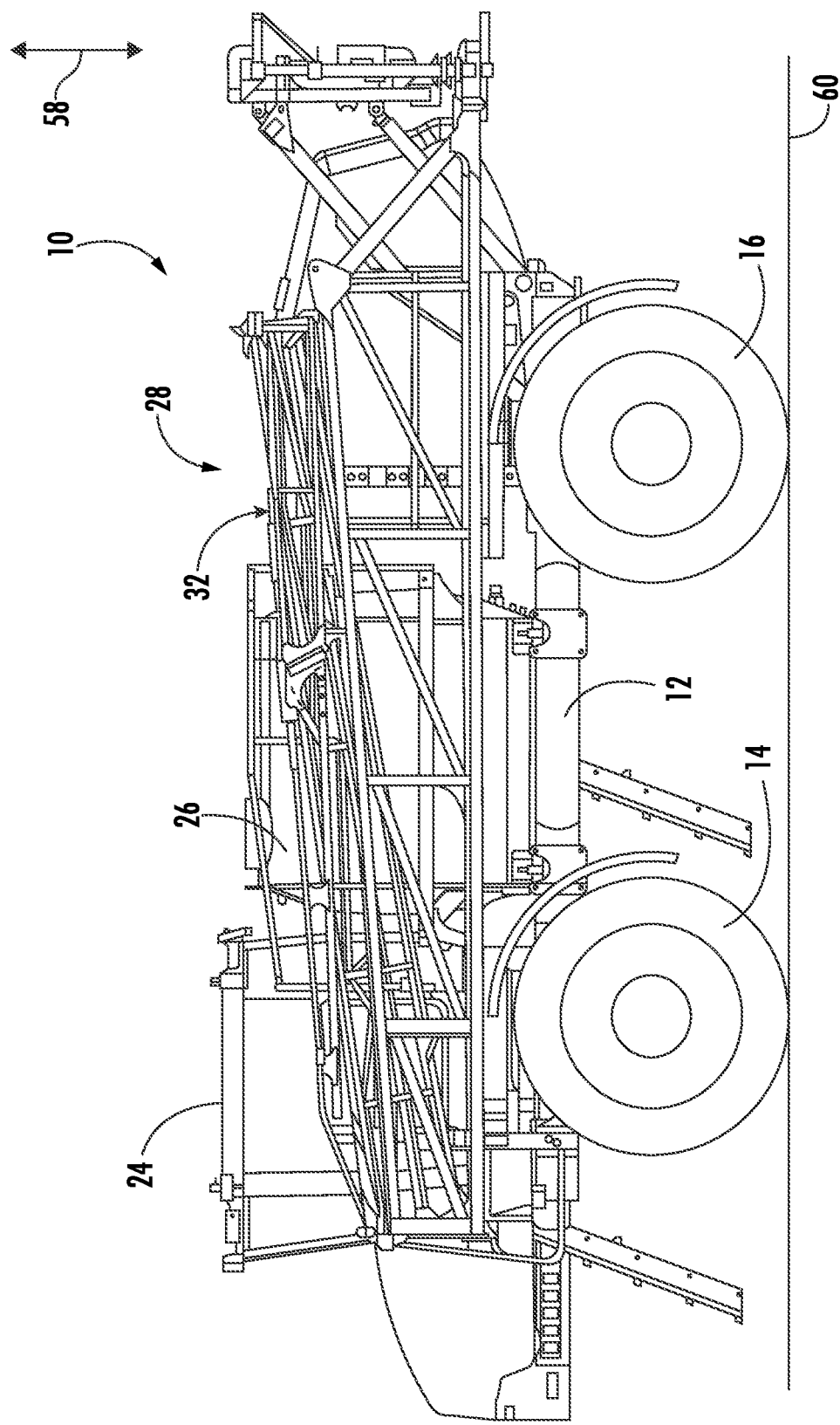
FIG. 2 illustrates a side view of the agricultural sprayer of FIG. 1 in accordance with aspects of the present subject matter.

Referring now to FIGS. 1 and 2, differing views of one embodiment of an agricultural sprayer 10 are illustrated in accordance with aspects of the present subject matter. Specifically, FIG. 1 illustrates a perspective view of the sprayer 10 with its boom assembly in a working or unfolded position and FIG. 2 illustrates a side view of the sprayer with its boom assembly in a transport or folded position. In the illustrated embodiment, the agricultural sprayer 10 is configured as a self-propelled agricultural sprayer. However, in alternative embodiments, the agricultural sprayer 10 may be configured as any other suitable type of agricultural sprayer 10 configured to perform agricultural spraying operations, such as a tractor or other vehicle configured to haul a spraying or application implement.

As shown in FIG. 1, the agricultural sprayer 10 may include a chassis or frame 12 configured to support or couple to a plurality of components. For example, a pair of steerable front wheels 14 (one is shown) and a pair of driven rear wheels 16 (one is shown) may be coupled to the frame 12. The wheels 14, 16 may be configured to support the agricultural sprayer 10 relative to the ground and move the agricultural sprayer 10 in a direction of travel (e.g., as indicated by arrow 18 in FIG. 1) across a field. In this regard, the agricultural sprayer 10 may include an engine (not shown) and a transmission (not shown) configured to transmit power from the engine to the wheels 14, 16. However, it should be appreciated that, in further embodiments, the front wheels 14 of the agricultural sprayer 10 may be driven in addition to or in lieu of the rear wheels 16. The frame 12 may also support an operator's cab 24 that houses various control or input devices (e.g., levers, pedals, control panels, buttons, and/or the like) for permitting an operator to control the operation of the sprayer 10. For instance, as shown in FIG. 1, the agricultural sprayer 10 may include a human-machine or user interface 22 for displaying message windows and/or alerts to the operator and/or for allowing the operator to interface with the vehicle's controller or computing system. In one embodiment, as will be described below in greater detail, the user interface 22 may include joysticks, buttons, knobs and/or any other suitable input devices that allow the operator to provide user inputs to an associated controller or computing system.

Furthermore, the frame 12 may also support one or more tanks 26 and a frame or boom assembly 28 mounted on the frame 12. Each tank 26 is generally configured to store or hold an agricultural product, such as a pesticide, a nutrient, and/or the like. A plurality of nozzle assemblies 68 are mounted on the boom assembly 28 and configured to selectively dispense the agricultural product stored in the associated tank 26 via nozzles onto underlying plants and/or soil. The nozzle assemblies 68 are generally spaced apart from each other on the boom assembly 28 along a lateral direction 50. Furthermore, fluid conduits (not shown) may fluidly couple the nozzle assemblies 68 to the tank(s) 26. Each nozzle assembly 68 may include a nozzle valve (not shown) and an associated spray tip or spray nozzle (not shown). In several embodiments, the operation of each nozzle valve may be individually controlled by an associated controller or computing system such that the valve regulates the flow rate and/or other spray characteristic of the agricultural product through the associated spray nozzle.

As shown in FIGS. 1 and 2, the boom assembly 28 of the agricultural sprayer 10 may generally be movable between a working or unfolded position (FIG. 1) and a transport or folded position (FIG. 2). In the working position, various sections of the boom assembly 28 are fully extended such that the boom assembly 28 extends over as wide a section of a field as possible. In the transport position, the various sections of the boom assembly 28 are fully retracted to reduce the width of the sprayer 10 for travel. As will be described below, the boom assembly 28 may include a plurality of fold actuators coupled between adjacent boom sections of the boom assembly 28 for moving the boom assembly 28 between the working and transport positions.

As shown in FIG. 1, in one embodiment, the boom assembly 28 includes a central boom section 30, a left boom arm 32, and a right boom arm 34. The left boom arm 32 includes a left inner boom section 32A pivotably coupled to the central boom section 30, a left middle boom section 32B pivotably coupled to the left inner boom section 32A, and a left outer boom section 32C pivotably coupled to the left middle boom section 32B. Similarly, the right boom arm 34 includes a right inner boom section 34A pivotably coupled to the central boom section 30, a right middle boom section 34B pivotably coupled to the right inner boom section 34A, and a right outer boom section 34C pivotably coupled to the right middle boom section 34B. Each of the inner boom sections 32A, 34A is pivotably coupled to the central boom section 30 at pivot joints 44. Similarly, the middle boom sections 32B, 34B are pivotally coupled to the respective inner boom sections 32A, 34A at pivot joints 46 while the outer boom sections 32C, 34C are pivotably coupled to the respective middle boom sections 32B, 34B at pivot joints 48.

As is generally understood, pivot joints 44, 46, 48 may be configured to allow relative pivotal motion between adjacent boom sections of the boom assembly 28. For example, the pivot joints 44, 46, 48 may allow for articulation of the various boom sections between a fully extended or working position (e.g., as shown in FIG. 1), in which the boom sections are unfolded along the lateral direction 50 to allow for the performance of an agricultural spraying operation, and a transport position (FIG. 2), in which the boom sections are folded inwardly to reduce the overall width of the boom assembly 28 along the lateral direction 50. It should be appreciated that, although the boom assembly 28 is shown in FIG. 1 as including a central boom section and three individual boom sections coupled to each side of the central boom sections, the boom assembly 28 may generally have any suitable number of boom sections. For example, in other embodiments, each boom arm 32, 34 may include four or more boom sections or less than three boom sections.

Additionally, as shown in FIG. 1, the boom assembly 28 may include inner fold actuators 52 coupled between the inner boom sections 32A, 34A and the central boom section 30 to enable pivoting or folding between the fully-extended working position and the transport position. For example, by retracting/extending the inner fold actuators 52, the inner boom sections 32A, 34A may be pivoted or folded relative to the central boom section 30 about a pivot axis 44A defined by the pivot joints 44. Moreover, the boom assembly 28 may also include middle fold actuators 54 coupled between each inner boom section 32A, 34A and its adjacent middle boom section 32B, 34B and outer fold actuators 56 coupled between each middle boom section 32B, 34B and its adjacent outer boom section 32C, 34C. As such, by retracting/extending the middle and outer fold actuators 54, 56, each middle and outer boom section 32B, 34B, 32C, 34C may be pivoted or folded relative to its respective inwardly adjacent boom section 32A, 34A, 32B, 34B about a respective pivot axis 46A, 48A. When moving to the transport position, the boom assembly 28 and fold actuators 52, 54, 56 are typically oriented such that the pivot axes 44A, 46A, 48A are parallel to the vertical direction 58 and, thus, the various boom sections 32A, 34A, 32B, 34B, 32C, 34C of the boom assembly 28 are configured to be folded horizontally (e.g., parallel to the lateral direction 50) about the pivot axes 44A, 46A, 48A to keep the folding height of the boom 28 as low as possible for transport. However, the pivot axes 44A, 46A, 48A may be oriented along any other suitable direction.

It should be appreciated that the specific configuration of the agricultural sprayer 10 described above and shown in FIGS. 1 and 2 is provided only to place the present subject matter in an exemplary field of use. In this regard, it should be apparent to those of ordinary skill in the art that the present subject matter may be readily adaptable to any manner of machine configuration that is consistent with the disclosure provided herein.

Figure 3:
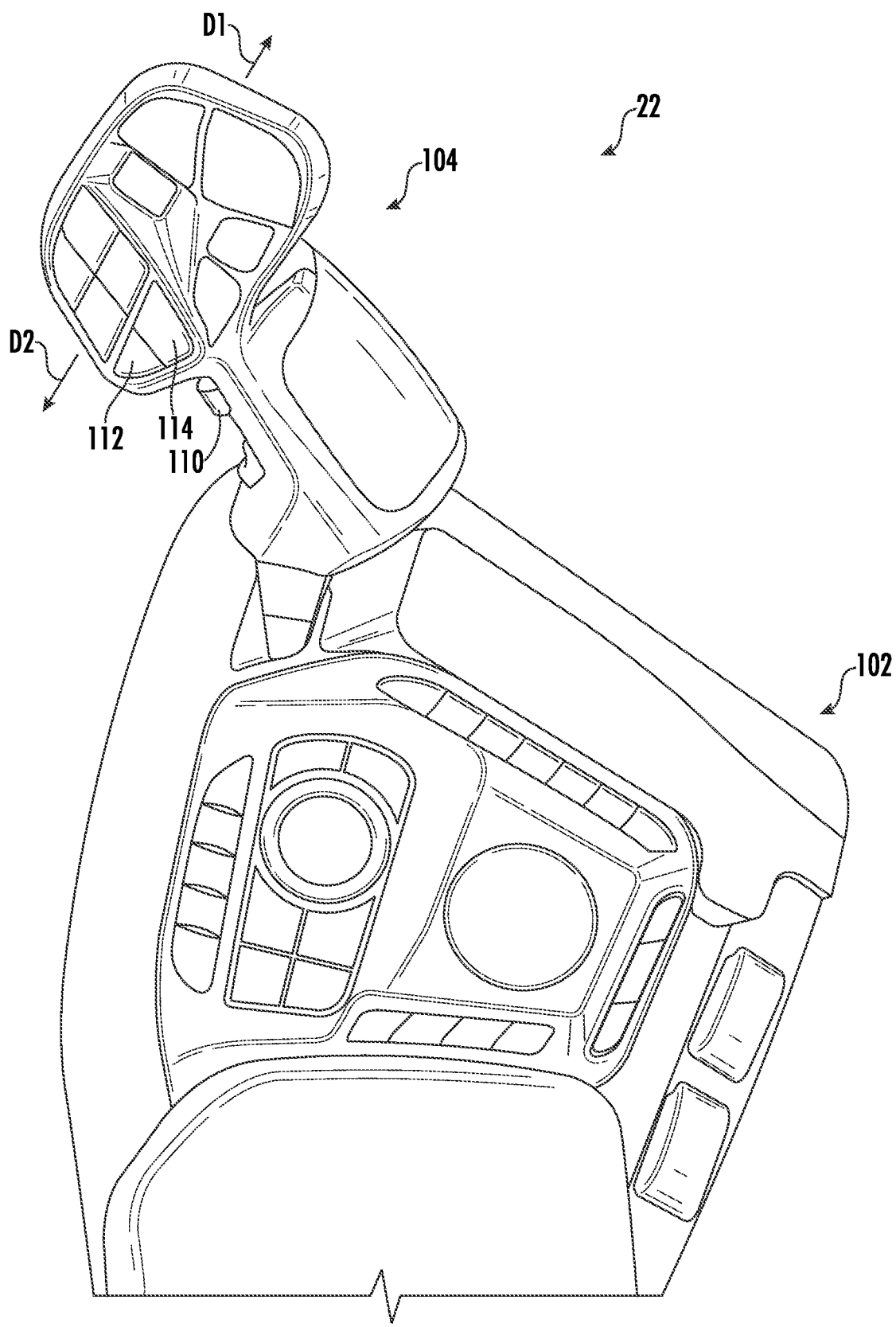
FIG. 3 illustrates a top-down view of a user interface suitable for use with a system for controlling a ground speed of an agricultural sprayer in accordance with aspects of the present subject matter.

Referring now to FIG. 3, one embodiment of a user interface 22 suitable for use with a system for controlling a ground speed of an agricultural sprayer (e.g., agricultural sprayer 10) is illustrated in accordance with aspects of the present subject matter. Particularly, in some embodiments, the user interface 22 includes an armrest control panel 102 (hereinafter referred to as "armrest 102") and a multi-function handle 104 (hereinafter referred to as "handle 104"). The handle 104 is generally movable relative to the armrest 102 for controlling a ground speed of the agricultural sprayer 10. For instance, the handle 104 may be movable relative to the armrest 102 across a range of positions. For example, the handle 104 may be movable in a first or forward direction D1 to a maximum forward position (not shown) and/or in a second or rearward direction D2, opposite the forward direction D1, to a maximum rearward position (not shown). Each position of the handle 104 between the maximum forward and rearward positions may generally correspond to a different ground speed of a ground speed range, where the ground speed range extends from a minimum range speed to a maximum range speed. For instance, each position of the handle 104 may correspond to a discrete speed within the ground speed range or a percentage of the maximum range speed of the ground speed range.

In several embodiments, the handle 104 corresponds to a spring-biased, return-to-neutral handle. Thus, in such embodiments, unlike speed control levers or multi-function handles that are maintained at an operator-selected position associated with a desired speed of the sprayer 10 after being released by the operator, the handle 104 is biased back towards its neutral position (shown in FIG. 3) upon release by the operator. For example, in such embodiments, the selected ground speed when the handle 104 is moved from the neutral position to the maximum forward position of the handle 104 is the maximum range speed or 100% of the maximum range speed of the ground speed range. Subsequently releasing the handle 104 causes the handle 104 to be biased back to the neutral position. The selected speed remains equal to the maximum range speed until the handle 104 is again biased away from the neutral position. Similarly, in some embodiments, the selected speed when the handle 104 is moved from the neutral position to the maximum rearward position of the handle 104 is the minimum range speed of the ground speed range or, alternatively, 0% of the maximum speed range (e.g., a zero speed). In some embodiments, the selected speed when the handle 104 is moved to a position halfway between the neutral and maximum forward position of the handle 104 is a median range speed of the ground speed range or 50% of the maximum range speed, and the selected speed when the handle 104 is moved to a position halfway between the neutral and maximum rearward positions of the handle 104 is 25% of the maximum range speed. However, it should be appreciated that the handle 104 may be moved to any other position between the maximum forward and rearward positions. It should further be appreciated that the positions of the handle 104 may correspond to any other speed of the ground speed range.

As will be described below in greater detail, when the sprayer 10 is operating within a speed-range mode, the selected speed may be selected by an operator holding the return-to-neutral handle 104 in the position for a threshold period of time before releasing. For instance, an operator may hold the handle 104 in the position associated with the selected speed for 0.5 seconds, 1 second, and/or the like before releasing in order to set the selected speed. A controller or computing system of the disclosed system may then be configured to automatically control the operation of drive elements of a drive system of the sprayer 10 to adjust the ground speed of the sprayer 10 to the selected speed from a current ground speed upon receipt of the input from the handle 104 without further input or operator manipulation of the handle 104. However, in other embodiments, the operator may hold the handle 104 in the position associated with the selected speed until a ground speed of the sprayer matches the selected speed.

It should be appreciated that, while the handle 104 is described and shown as a speed control lever, joystick, or handle, the handle 104 may be configured as any suitable user input device that is actuatable across a range of positions such as a scroll-wheel, a knob, and/or the like. It should additionally be appreciated that the handle 104 may be configured to have any other suitable movement. For instance, in some embodiments, the handle 104 may be maintained at an operator-selected position associated with a desired speed of the sprayer 10 after being released by the operator instead of returning to a neutral position.

In some embodiments, the sprayer is configured to be operated within a given ground speed range of a plurality of operator-selectable ground speed ranges. In such embodiments, the user interface 22 further includes a range selector device 108 (FIG. 4) for selecting between the plurality of ground speed ranges. Each ground speed range of the plurality of ground speed ranges has a minimum range speed and a maximum range speed. In some embodiments, each ground speed range has a maximum range speed that differs from the maximum range speeds of the remainder of the plurality of ground speed ranges. Particularly, as will be discussed below in greater detail, one or more of the ground speed ranges will have a maximum range speed that is lower than the maximum ground speed of the sprayer 10. Additionally, in some embodiments, the minimum range speed and/or the maximum range speed of each ground speed range may be adjustable. For instance, the user interface 22 may further include a range adjustor device 110 for adjusting the minimum range speed and/or the maximum range speed of a selected ground speed range. It should be appreciated that the range selector device 108 and the range adjustor device 110 may each correspond to any suitable input device, or combination of input devices, for adjusting the minimum and/or maximum range speeds such as one or more buttons, scroll wheels, knobs, sliders, and/or any other suitable input device on the armrest 102, handle 104, display screen 113 (FIG. 4) and/or at any other suitable location within the cab 24.

In one embodiment, when an operator switches to a different ground speed range of the plurality of ground speed ranges using the range selector device 108, the most recent actuated or selected position of the handle 104 is then associated with a respective, selected ground speed of the newly selected ground speed range. For instance, if the handle 104 was actuated to the maximum forward position associated with 100% of a first ground speed range (e.g., 10 MPH) and an operator subsequently selected a second ground speed range, the selected ground speed then becomes 100% of the second ground speed range (e.g., 15 MPH). However, in other embodiments, switching between different ground speed ranges may cause any other suitable change in the selected ground speed or may not result in any change in the ground speed until the operator actuates the handle 104.

Moreover, in some embodiments, the user interface 22 may include one or more preset speed input devices 112 for adjusting the selected speed to a preset speed. For instance, in some embodiments, each preset speed input device 112 may be associated with a different, predetermined speed of the agricultural sprayer 10. When an operator presses a preset speed input device 112, a controller of the disclosed system may adjust the operation of the sprayer 10 such that the ground speed of the sprayer 10 is increased or decreased to the ground speed associated with the preset speed input device 112.

Additionally, in some embodiments, a display screen 113 (FIG. 4) of the user interface 22 may be configured to display to the operator the selected speed, a current ground speed of the sprayer 10, the plurality of ground speed ranges, the selected ground speed range, and/or the like. The display screen 113 may include a touchscreen 134 (FIG. 4) mounted within a cockpit module, an instrument cluster, and/or any other location within the cab 24. The display 113 may be capable of displaying information related to the operation of the sprayer 10, such as the selected speed, the current ground speed of the sprayer 10, the selected ground speed range, and/or the like. In one embodiment, the display 113 may include an input device in the form of circuitry within the touchscreen to receive an input corresponding with a location over the display 113.

Conventionally, when the maximum range speed of the current ground speed range is less than the maximum ground speed of the sprayer 10, in order to increase the ground speed of the sprayer 10 to the maximum ground speed of the sprayer 10, an operator must increase the maximum range speed of the current ground speed range to the maximum ground speed of the sprayer 10 or change to a different range speed having a maximum range speed equal to the maximum ground speed of the sprayer and then move the handle 104 to the position associated with such maximum range speed. However, such maneuvers are time consuming, and require the operator to "un-do" or reset such changes if it is desired to resume the previous speed-range mode.

Thus, in accordance with aspects of the present subject matter, the disclosed user interface 22 further includes a speed override input device 114. The speed override input device 114 is configured to allow the operator to command that the ground speed of the agricultural sprayer 10 be increased to the maximum ground speed of the agricultural sprayer 10, regardless of the maximum range speed of the currently selected ground speed range, and without actuation the handle 104 (e.g., to another position). As will be described in greater detail below, when a controller of the disclosed system receives an input from the speed override input device 114, the controller may be configured to automatically control the operation of drive elements of the sprayer 10 to increase the ground speed of the sprayer 10 from the current ground speed to the maximum ground speed of the sprayer 10. It should be appreciated that the speed override input device 114 may comprise any suitable input device of the user interface 22 for commanding the maximum ground speed of the sprayer 10, such as a button, a switch, knob, and/or the like. In some embodiments, the speed override input device 114 may be provided on the handle 104. However, it should be appreciated that the speed override input device 114 may be positioned at any other suitable location on the user interface 22.

Figure 4:
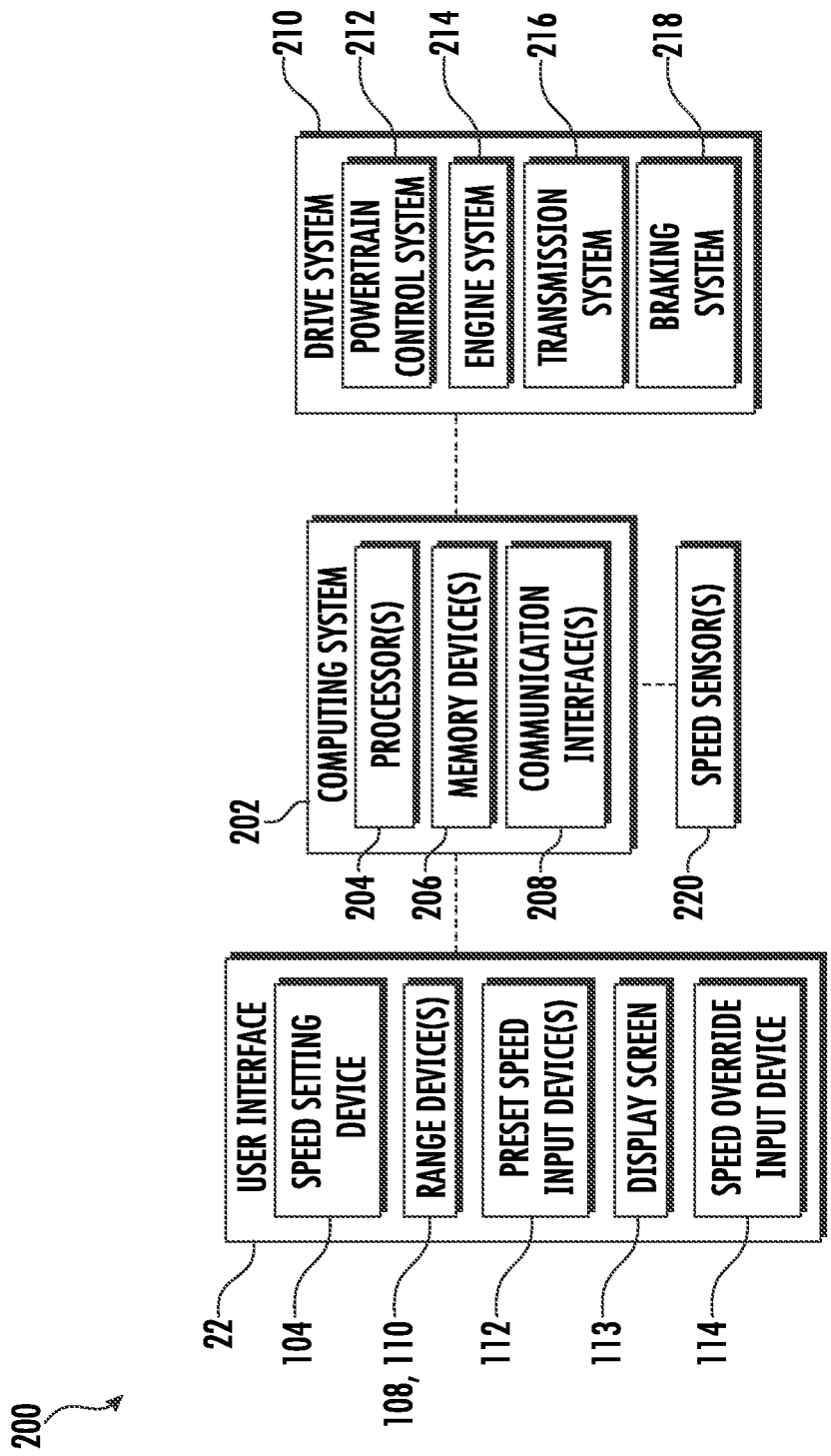
FIG. 4 illustrates a schematic view of a system for controlling a ground speed of an agricultural sprayer in accordance with aspects of the present subject matter.

Referring now to FIG. 4, a schematic view of one embodiment of a system 200 for controlling a ground speed of an agricultural sprayer is illustrated in accordance with aspects of the present subject matter. In general, the system 200 will be described herein with reference to the agricultural sprayer 10 described above with reference to FIGS. 1 and 2, and the example user interface 22 described above with reference to FIG. 3. However, it should be appreciated that the disclosed system 200 may generally be utilized with sprayers having any other suitable sprayer configuration and/or with user interfaces having any other suitable interface configuration consistent with the disclosure provided herein.

In several embodiments, the system 200 may include a computing system 202 and various components, features, systems and/or sub-systems configured to be communicatively coupled to the computing system 202. In general, the computing system 202 may be configured to perform various computer-related functions or tasks, including, for example, receiving data from one or more components, features, systems and/or sub-systems of the sprayer 10, storing and/or processing data received or generated by the computing system 202, and/or controlling the operation of one or more components, features, systems and/or sub-systems of the sprayer 10.

In general, the computing system 202 may correspond to any suitable processor-based device(s), such as a computing device or any combination of computing devices. Thus, as shown in FIG. 4, the computing system 202 may generally include one or more processor(s) 204 and associated memory devices 206 configured to perform a variety of computer-implemented functions (e.g., performing the methods, steps, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device 206 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device 206 may generally be configured to store information accessible to the processor(s) 204, including data that can be retrieved, manipulated, created and/or stored by the processor(s) 204 and instructions that can be executed by the processor(s) 204.

As further shown in FIG. 4, the computing system 202 is configured to be communicatively coupled to the user interface 22 (e.g., including the speed setting device 104, the range device(s) 108, 110, the display screen 113, and the speed override input device 114). As such, the computing system 202 may be configured to receive inputs from the different input devices 104, 108, 110, 112, 113, 114 which may indicate a desired or selected ground speed of the sprayer 10, and/or to control the operation of the display screen 113 to display information about the ground speed of the sprayer 10 (e.g., the current ground speed, the selected ground speed, the selected ground speed range, and/or the like).

Further, the computing system 202 is configured to be communicatively coupled to a drive system 210 of the agricultural sprayer 10, particularly to a powertrain control system 212 of the drive system 210. The computing system 202 may generally be configured to control the operation of the drive system 210 based at least in part on the inputs received from the user interface 22. The powertrain control system 212 generally includes an engine output control system 214, a transmission control system 216, and a braking control system 218. The engine output control system 214 is configured to vary the output of the engine to control the ground speed of the sprayer 10. For example, the engine output control system 214 may vary a throttle setting of the engine, a fuel/air mixture of the engine, a timing of the engine, and/or other suitable engine parameters to control engine output. In addition, the transmission control system 216 may adjust gear selection within a transmission to control the ground speed of the sprayer 10. Furthermore, the braking control system 218 may adjust braking force, thereby controlling the speed of the sprayer 10. While the illustrated powertrain control system 212 includes the engine output control system 214, the transmission control system 216, and the braking control system 218, it should be appreciated that alternative embodiments may include one or two of these systems, in any suitable combination. Further embodiments may include another powertrain control system having other and/or additional systems to facilitate adjusting the ground speed of the sprayer 10.

Moreover, in some embodiments, the computing system 202 is configured to be communicatively coupled to one or more sensors configured to detect a current ground speed of the sprayer 10. For instance, the computing system 202 may be communicatively coupled to one or more ground speed sensors 220 (hereinafter referred to as "speed sensor(s) 220") configured to generate data indicative of the ground speed of the sprayer 10. The data generated by the speed sensor(s) 220 may be transmitted to the computing system 202 for subsequent processing and/or for subsequent storage within the memory 206 of the computing system 202. The speed sensor(s) 220 may comprise any suitable sensor positioned at any suitable location on the sprayer 10 for generating data indicative of the ground speed of the sprayer 10, such as a radar sensor, a GPS sensor, and/or the like. In some embodiments, the speed sensor(s) 220 may be part of the drive system 210, such as part of the powertrain control system 212, to monitor an operating parameter (e.g., rotational speed, rotational acceleration, and/or the like) of one or more components of the power-train control system 212 indicative of the sprayer ground speed.

Additionally, in some embodiments, the computing system 202 may be configured to include one or more communications modules or interfaces 208 for the computing system 202 to communicate with any of the various system components described herein. For instance, one or more communicative links or interfaces (e.g., one or more data buses) may be provided between the communications interface 208 and the user interface 22 (e.g., including the speed setting device 104, range device(s) 108, 110, preset speed input device(s) 112, display screen 113, and the speed override input device 114) to allow the computing system 202 to receive data indicative of a selected ground speed, a selected ground speed range, and/or the like from the user interface 22. Further, one or more communicative links or interfaces (e.g., one or more data buses) may be provided between the vehicle drive system 210 (e.g., to the powertrain control system 212) to allow the computing system 202 to control the ground speed of the sprayer 10. Additionally, one or more communicative links or interfaces (e.g., one or more data buses) may be provided between the communications interface 208 and the speed sensor(s) 220 to allow the computing system 202 to receive data indicative of the current ground speed of the sprayer 10.

As indicated above, the computing system 202 may be configured to control the ground speed of the sprayer 10 based at least in part on inputs received from the user interface 22. For example, the computing system 202 may be configured to control the ground speed of the sprayer 10 within a speed-range mode associated with a ground speed range when an input is received from one or more of the speed setting device (i.e., handle 104), the range selector device 108, and the range adjustor device 110. However, the computing system 202 may alternatively, or additionally, be configured to control the ground speed of the sprayer 10 within a speed-range mode associated with a ground speed range whenever the sprayer 10 is initially put into a drive mode of the transmission, the engine is initially started, and/or the like.

When the speed-range mode is enabled, the computing system 202 may determine a desired or selected ground speed of the sprayer based at least in part on an input received from the speed setting device 104 (i.e., handle 104). More particularly, as indicated above, each position of the handle 104 is associated with a different speed within a ground speed range associated with the speed-range mode. As such, the computing system 202 may control an operation of the drive system 210 to adjust the ground speed of the agricultural sprayer 10 based at least in part on the selected ground speed associated with the actuated or selected position of the handle 104. For instance, the computing system 202 may control the operation of the drive system 210 to automatically increase or decrease the ground speed of the sprayer 10 from a current ground speed of the sprayer 10 to the selected ground speed. For example, to command a maximum range speed of the associated ground speed range, the operator moves the handle 104 to the maximum forward position. When the handle 104 is configured as a return-to-neutral lever, the operator may be instructed to hold the handle 104 in the actuated or selected position for at least a predetermined time period (e.g., 0.5 seconds, 1 second, and/or the like) before the computing system 202 determines that the selected ground speed is the ground speed associated with the actuated position of the handle 104. The operator can then release the handle 104 to allow it to return back to its neutral position.

Upon recognizing such operator input associated with the handle 104 (e.g., after the handle 104 is held in an actuated position for at least the given time period), the computing system 202 may then automatically control an operation of the drive system 210 to automatically adjust the ground speed of the sprayer 10 to the selected ground speed from the current ground speed. In one embodiment, the computing system 202 may then automatically control an operation of the drive system 210 to automatically increase the ground speed of the sprayer 10 based at least in part on a differential between the current ground speed and the selected ground speed (e.g., the maximum range speed) when in the speed-range mode. More particularly, such ramping up of the ground speed may be executed according to a preset ramping algorithm. For instance, in several embodiments, the ramping algorithm may specify that the speed command transmitted to the drive system 210 be increased or ramped up as a function of the current ground speed of the sprayer 10 (e.g., as determined based on sensor feedback from speed sensor(s) 220) and a constant ramp value. Specifically, in one embodiment, the speed command may be calculated as a function of the summation of the current ground speed of the sprayer 10 and the constant ramp value such that the ground speed is continuously ramped-up to the selected ground speed (e.g., the maximum range speed). In some embodiments, the constant ramp value may be selected based at least in part on the differential between the current and selected ground speeds. It should be appreciated that the computing system 202 may perform similar automatic control of the drive system 210 for ramping-up to any selected ground speed that is greater than the current ground speed or for ramping down to a selected ground speed that is lower than a current ground speed.

In embodiments where the ground speed range is one of a plurality of ground speed ranges, the computing system 202 may additionally be configured to receive an input from the range selector device 108 indicative of selecting a given ground speed range from the plurality of ground speed ranges. For instance, as indicated above, when the computing system 202 receives an input indicative of a selection of a new ground speed range from the plurality of ground speed ranges, the computing system 202 may, for example, be configured to control the operation of the drive system 210 according to the speed-range mode to adjust the ground speed of the sprayer 10 to a new selected ground speed, which may be the ground speed of the new ground speed range associated with the most recently actuated position of the handle 104. Additionally, the computing system 202 may be configured to receive inputs from the range adjustor device 110 for adjusting the maximum and/or minimum range speeds of the ground speed range, and to control the operation of the drive system 210 to adjust the ground speed of the sprayer 10, accordingly.

In accordance with aspects of the present subject matter, the computing system 202 may further be configured to receive inputs from the speed override input device 114 which allows the operator to command a maximum ground speed of the sprayer 10. As indicated above, such a command may be particularly advantageous when the maximum ground speed exceeds the maximum range speed for the selected ground speed range. For instance, upon receipt of an input from the speed override input device (e.g., an operator actuating the speed override input device 114), the computing system 202 may automatically control the operation of the drive system 210 to increase the sprayer ground speed from the current ground speed to the maximum ground speed, thereby overriding the speed-range mode, without any input or operator manipulation of the handle 104. In one embodiment, the computing system 202 may control the operation of the drive system 210 according to a differential between the current ground speed and the maximum ground speed when the override input has been received from the speed override input device 114. More particularly, the computing system 202 may control the operation of the drive system 210 according to a preset ramping algorithm (e.g., by increasing the speed command as a function of the current ground speed and a constant ramp value). For example, the ramping algorithm may specify that the speed command transmitted to the drive system 210 be increased or ramped up as a function of the current ground speed of the sprayer 10 (e.g., as determined based on sensor feedback from speed sensor(s) 220) and a constant ramp value. Specifically, in one embodiment, the speed command may be calculated as a function of the summation of the current ground speed of the sprayer 10 and the constant ramp value such that the ground speed is continuously ramped-up to the maximum ground speed of the sprayer 10. In some embodiments, the constant ramp value is determined based at least in part on the differential between the current and maximum ground speeds.

Additionally, after the computing system 202 controls the operation of the drive system 210 to increase the sprayer ground speed from the current ground speed to the maximum ground speed in response to the input from the speed override input device 114, the computing system 202 may be configured to return to controlling the ground speed of the sprayer 10 within a speed-range mode associated with a ground speed range when a subsequent input is received from one or more of the speed setting device (i.e., handle 104), the range selector device 108, and the range adjustor device 110. For instance, after receiving a subsequent input(s) from one or more of the speed setting device (i.e., handle 104), the range selector device 108, and/or the range adjustor device 110, the computing system 202 may control the operation of the drive system 210 to adjust the ground speed of the sprayer 10 according to the selected speed associated with such input(s).

As such, the disclosed speed override input device 114 allows for a quick input to the computing system 202 for automatically controlling the ground speed of the agricultural sprayer 10 to the maximum ground speed of the sprayer 10, regardless of the maximum range speed of the selected ground speed range.

Figure 5:
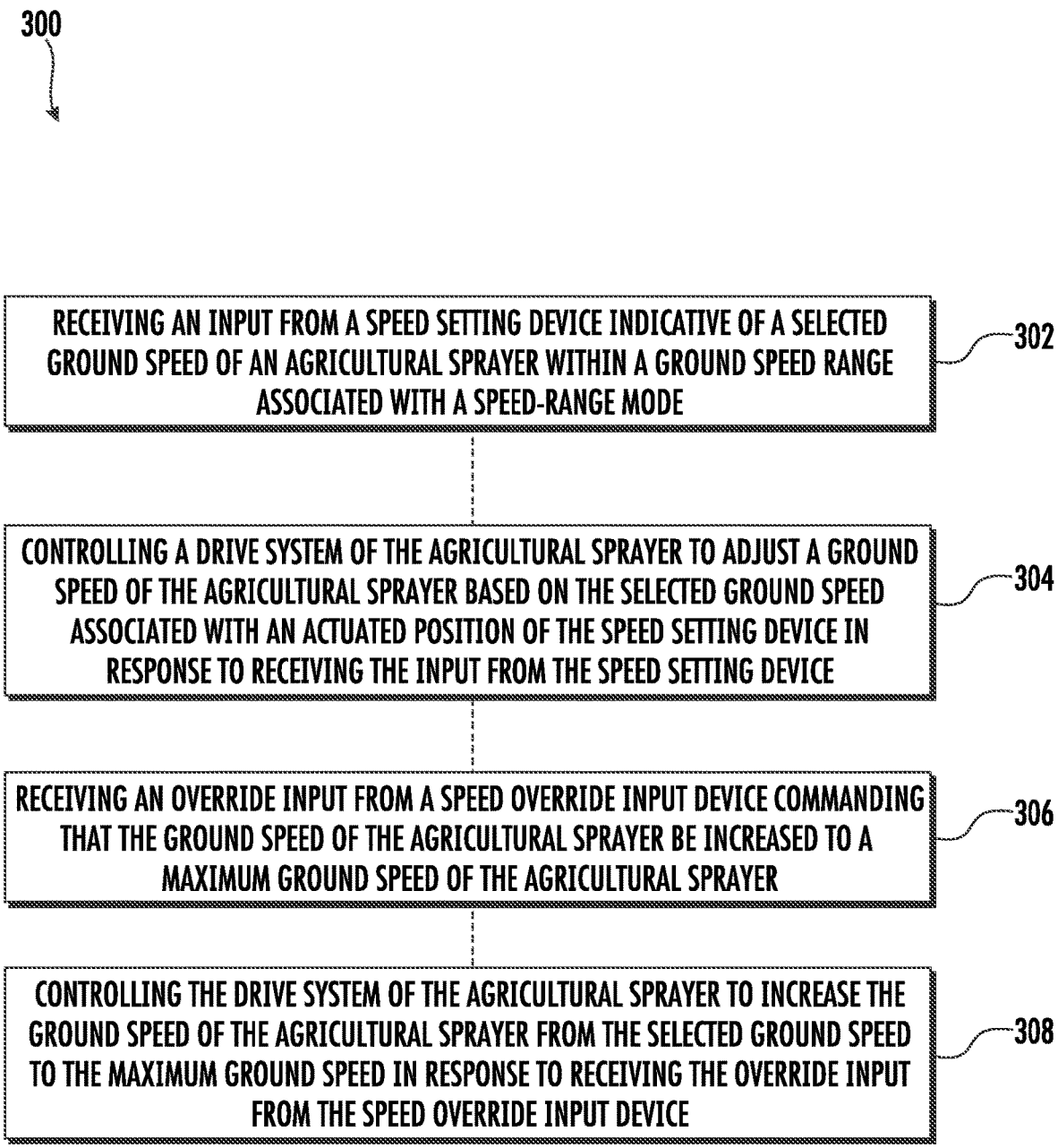
FIG. 5 illustrates a flow diagram of one embodiment of a method for controlling a ground speed of an agricultural sprayer in accordance with aspects of the present subject matter.

Referring now to FIG. 5, a flow diagram of one embodiment of a method 300 for controlling a ground speed of an agricultural sprayer is illustrated in accordance with aspects of the present subject matter. In general, the method 300 will be described herein with reference to the agricultural sprayer 10 described with reference to FIGS. 1 and 2, the user interface 22 described with reference to FIG. 3, and the computing system 200 described with reference to FIG. 4. However, it should be appreciated that the disclosed method 300 may be implemented with agricultural sprayers 10 having any other suitable configuration, with user interface 22 having any other suitable interface configuration, and/or with systems having any other suitable system configuration for performing the method described. In addition, although FIG. 5 depicts steps performed in a particular order for purposes of illustration and discussion, the methods discussed herein are not limited to any particular order or arrangement. One of ordinary skill in the art, using the disclosures provided herein, will appreciate that various steps of the method disclosed herein can be omitted, rearranged, combined, and/or adapted in various ways without deviating from the scope of the present disclosure.

As shown in FIG. 5, at (302), the method 300 may include receiving an input from a speed setting device indicative of a selected ground speed of an agricultural sprayer within a ground speed range associated with a speed-range mode. As discussed above, the speed setting device (e.g., handle 104) is movable across a plurality of positions, with each position of the speed setting device 104 being associated with a different ground speed of the currently selected ground speed range, with the ground speed range extending from a minimum range speed to a maximum range speed. Additionally, as indicated above, the maximum range speed for the ground speed range is typically lower than the maximum ground speed of the agricultural sprayer 10. The computing device 202 may receive an input from the speed setting device 104 indicative of a selected ground speed within the ground speed range associated with the speed-range mode.

Further, at (304), the method 300 may include controlling a drive system of the agricultural sprayer to adjust a ground speed of the agricultural sprayer based on the selected ground speed associated with an actuated position of the speed setting device in response to receiving the input from the speed setting device. More particularly, as indicated above, the input from the speed setting device 104 may be indicative of an actuated position of the speed setting device 104, which, in turn, is associated with a selected ground speed within the applicable ground speed range. As such, the computing device 202 may control an operation of the drive system 210 (e.g., of the powertrain control system 212) to adjust the ground speed of the agricultural sprayer 10 to the selected ground speed associated with the actuated position of the speed setting device 104.

Moreover, at (306), the method 300 may include receiving an override input from a speed override input device commanding that the ground speed of the agricultural sprayer be increased to a maximum ground speed of the agricultural sprayer. For example, as discussed above, the computing device 202 may receive the override input from the speed override input device 114 in response to actuation of the speed override input device 114 by an operator, where the override input commands that the ground speed of the agricultural sprayer be increased to the maximum ground speed.

Additionally, at (308), the method 300 may include controlling the drive system of the agricultural sprayer to increase the ground speed of the agricultural sprayer from the selected ground speed to the maximum ground speed in response to receiving the override input from the speed override input device. For instance, as indicated above, the computing device 202 may control an operation of the drive system 210 (e.g., of the powertrain control system 212) to adjust the ground speed of the agricultural sprayer 10 to the maximum ground speed of the sprayer in response to receiving the override input from the speed override input device 114.

It is to be understood that the steps of the method 300 are performed by the computing system 200 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 200 described herein, such as the method 300, is implemented in software code or instructions which are tangibly stored on a tangible computer readable medium. The computing system 200 loads the software code or instructions via a direct interface with the computer readable medium or via a wired and/or wireless network. Upon loading and executing such software code or instructions by the computing system 200, the computing system 200 may perform any of the functionality of the computing system 200 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling a ground speed of an agricultural sprayer, the system comprising:
    a speed setting device for commanding a selected ground speed of the agricultural sprayer when operating within a speed-range mode associated with a ground speed range, the speed setting device being movable across a plurality of positions, with each position of the speed setting device being associated with a different ground speed within the ground speed range, the ground speed range extending from a minimum range speed to a maximum range speed, the maximum range speed being lower than a maximum ground speed of the agricultural sprayer;
    a speed override input device for commanding that the ground speed of the agricultural sprayer be increased to the maximum ground speed;
    a drive system configured to adjust the ground speed of the agricultural sprayer; and
    a computing system communicatively coupled to the speed setting device, the speed override input device, and the drive system,
    wherein:
    the computing system is configured to control an operation of the drive system to adjust the ground speed of the agricultural sprayer based on the selected ground speed associated with an actuated position of the speed setting device when in the speed-range mode, and
    when an override input is received from the speed override input device, the computing system is configured to control the operation of the drive system to increase the ground speed of the agricultural sprayer from the selected ground speed to the maximum ground speed.

2. The system of claim 1, wherein the ground speed range is selected from a plurality of ground speed ranges, each ground speed range of the plurality of ground speed ranges having a maximum range speed that differs from the remainder of the plurality of ground speed ranges, each maximum range speed of the plurality of ground speed ranges being lower than the maximum ground speed.

3. The system of claim 2, further comprising a range selector device for selecting between the plurality of ground speed ranges,
    wherein the computing system operates in the speed-range mode when an input is received from the range selector device.

4. The system of claim 1, wherein the speed setting device comprises a speed control lever.

5. The system of claim 4, wherein the speed override input device is provided on the speed control lever.

6. The system of claim 1, wherein the speed setting device is biased towards a neutral position,
    wherein the computing system is configured to determine the selected ground speed when the speed setting device is held at the actuated position of the plurality of positions for a predetermined time period.

7. The system of claim 1, further comprising one or more ground speed sensors configured to generate data indicative of a current ground speed of the agricultural sprayer, the computing system being configured to control the operation of the drive system based at least in part on the current ground speed and the selected ground speed when in the speed-range mode or the current ground speed and the maximum ground speed when the override input has been received from the speed override input device.

8. The system of claim 7, wherein the computing system is configured to control the operation of the drive system according to a preset ramping algorithm as a function of the current ground speed and a constant ramp value based at least in part on the current ground speed and the selected ground speed when in the speed-range mode or the current ground speed and the maximum ground speed when the override input has been received from the speed override input device.

9. The system of claim 1, wherein the computing system is configured to control the operation of the drive system to increase the ground speed of the agricultural sprayer from the selected ground speed to the maximum ground speed upon receipt of the override input without requiring operator manipulation of the speed setting device.

10. The system of claim 1, wherein the computing system is configured to return to the speed-range mode when a further input is received from at least one of the speed setting device or another speed input device subsequent to receiving the override input from the speed override input device.

11. A method for controlling a ground speed of an agricultural sprayer, the method comprising:
    receiving, with one or more computing devices, an input from a speed setting device indicative of a selected ground speed within a ground speed range associated with a speed-range mode, the speed setting device being movable across a plurality of positions, with each position of the speed setting device being associated with a different ground speed of the ground speed range, the ground speed range extending from a minimum range speed to a maximum range speed, the maximum range speed being lower than a maximum ground speed of the agricultural sprayer;
    controlling, with the one or more computing devices, an operation of a drive system of the agricultural sprayer to adjust the ground speed of the agricultural sprayer based on the selected ground speed associated with an actuated position of the speed setting device in response to receiving the input from the speed setting device;
    receiving, with the one or more computing devices, an override input from a speed override input device commanding that the ground speed of the agricultural sprayer be increased to the maximum ground speed; and
    controlling, with the one or more computing devices, the operation of the drive system of the agricultural sprayer to increase the ground speed of the agricultural sprayer from the selected ground speed to the maximum ground speed in response to receiving the override input from the speed override input device.

12. The method of claim 11, wherein the ground speed range is selected from a plurality of ground speed ranges, each ground speed range of the plurality of ground speed ranges having a maximum range speed that differs from the remainder of the plurality of ground speed ranges, each maximum range speed of the plurality of ground speed ranges being lower than the maximum ground speed.

13. The method of claim 12, further comprising a range selector device for selecting between the plurality of ground speed ranges,
wherein the speed-range mode is enabled when an input is received from the range selector device.

14. The method of claim 11, wherein the speed setting device comprises a speed control lever.

15. The method of claim 14, wherein the speed override input device is provided on the speed control lever.

16. The method of claim 11, wherein the speed setting device is biased towards a neutral position,
the method further comprising determining the selected ground speed based at least in part on the speed setting device being held at the actuated position of the plurality of positions for a predetermined time period.

17. The method of claim 11, further comprising determining, with the one or more computing devices, a current ground speed of the agricultural sprayer based at least in part on data received from one or more ground speed sensors indicative of the current ground speed,
wherein controlling the operation of the drive system of the agricultural sprayer comprises controlling the operation of the drive system based at least in part on the current ground speed and the selected ground speed when in the speed-range mode or the current ground speed and the maximum ground speed when the override input has been received from the speed override input device.

18. The method of claim 17, wherein controlling the operation of the drive system based at least in part on the current ground speed and the selected ground speed when in the speed-range mode or the current ground speed and the maximum ground speed when the override input has been received from the speed override input device comprises controlling the operation of the drive system according to a preset ramping algorithm as a function of the current ground speed and a constant ramp value.

19. The method of claim 11, wherein controlling the operation of the drive system to increase the ground speed of the agricultural sprayer from the selected ground speed to the maximum ground speed comprises controlling the operation of the drive system to increase the ground speed of the agricultural sprayer from the selected ground speed to the maximum ground speed upon receipt of the override input without requiring operator manipulation of the speed setting device.

20. The method of claim 11, further comprising controlling, with the one or more computing devices, the operation of the drive system according to the speed-range mode when a further input is received from at least one of the speed setting device or another speed input device subsequent to receiving the override input from the speed override input device.

* * * * *